United States Patent [19]

Amos et al.

[11] Patent Number: 4,809,064

[45] Date of Patent: Feb. 28, 1989

[54] ENLARGING PHOTOGRAPHIC PRINTER

[75] Inventors: Shaun M. Amos; Richard J. Backus, both of Rochester; Thomas C. Jessop, Webster, all of N.Y.

[73] Assignee: Eastman Kodak Company, Rochester, N.Y.

[21] Appl. No.: 122,995

[22] Filed: Nov. 19, 1987

[51] Int. Cl.[4] .................. H04N 7/18; G03B 13/28
[52] U.S. Cl. ........................... 358/76; 355/43; 355/45; 358/102
[58] Field of Search ............ 358/76, 102; 355/5, 355/45, 43; 350/423

[56] References Cited

U.S. PATENT DOCUMENTS

| | | | |
|---|---|---|---|
| 3,398,664 | 8/1968 | Bonatsos et al. | 358/97 |
| 3,824,336 | 7/1974 | Gould et al. | 178/6.8 |
| 3,826,571 | 7/1974 | Spence | 355/46 |
| 4,130,834 | 12/1978 | Mender | 358/127 |
| 4,368,484 | 1/1983 | Stemme | 358/41 |
| 4,373,156 | 2/1983 | Pfannkuch | 340/703 |
| 4,430,668 | 2/1984 | Miles, Jr. | 358/75 |
| 4,482,924 | 11/1984 | Brownstein | 358/302 |
| 4,485,406 | 11/1984 | Brownstein | 358/227 |
| 4,488,244 | 12/1984 | Freeman | 364/525 |
| 4,496,983 | 1/1985 | Takenaka | 358/287 |
| 4,506,300 | 3/1985 | Fearnside | 358/225 |
| 4,536,848 | 8/1985 | d'Entremont et al. | 364/526 |
| 4,602,294 | 7/1986 | Yamada | 358/280 |
| 4,603,966 | 8/1986 | Brownstein | 355/45 |
| 4,616,926 | 10/1986 | DiPietro | 355/45 |
| 4,631,599 | 12/1986 | Cawkell | 358/285 |
| 4,645,334 | 2/1987 | Shimada et al. | 355/40 |
| 4,656,524 | 4/1987 | Norris et al. | 358/280 |
| 4,656,525 | 4/1987 | Norris | 358/280 |
| 4,692,797 | 9/1987 | Matsumoto | 358/76 |
| 4,694,354 | 9/1987 | Tanaka | 358/76 |
| 4,714,962 | 12/1987 | Levine | 358/76 |
| 4,716,470 | 12/1987 | Levine | 358/76 |
| 4,751,583 | 6/1988 | Levine | 358/280 |

FOREIGN PATENT DOCUMENTS 2174568 11/1986 United Kingdom .

Primary Examiner—Howard W. Britton
Attorney, Agent, or Firm—Jeffery L. Brandt

[57] ABSTRACT

Apparatus for printing a selected region of a photographic negative onto a photosensitive paper to form an enlarged and cropped photographic print includes means for projecting the photographic negative onto first and second zoom lenses, each of the zoom lenses having an adjustable magnification. Means are provided for defining, by adjusting the magnification of the first zoom lens, the selected region of the photographic negative to be printed. Means are provided for adjusting, as a function of the magnification of the first zoom lens, the magnification of the second zoom lens so as to image the selected region of the photographic negative onto the photosensitive paper. Further, means are provided for exposing the selected region of the photographic negative through the second zoom lens onto the photosensitive paper for a predetermined period of time.

31 Claims, 3 Drawing Sheets

ENLARGING PHOTOGRAPHIC PRINTER

CROSS-REFERENCE TO RELATED APPLICATION

U.S. Pat. Application Ser. No. 122,991 (PHOTOGRAPHIC PRINTER; R. Backus, P. Cosgrove) assigned to the assignee of the present invention and filed on even date herewith.

FIELD OF THE INVENTION

The present invention relates generally to photographic printers, and more specifically to a photographic printer for printing a selected region of a photographic negative onto a photographic paper whereby to form an enlarged and cropped print of the photographic negative.

BACKGROUND OF THE INVENTION

When printing a photographic negative, it is often desirable to enlarge and print only a particular region or subject of interest, thereby eliminating unwanted background or excess. Such a process is referred to as "cropping", and usually produces an aesthetically superior print. Such cropping is performed during the actual printing of the negative, and typically requires operator interaction with the complex controls of a photographic printer. Accordingly, professional photographers, who do their own printing, routinely crop their prints to provide maximum visual impact.

In the past, amateur photographers, who sent their negatives to laboratories for printing, either had to forfeit the benefits of cropping, or rely on typically unreliable methods of communicating the desired cropping to the lab. Such methods included, for example, written descriptions of the desired cropping and/or hand-marking of the negatives.

As technology improved, communications between amateur photographers and photographic laboratories become more sophisticated, and the cropping process became more reliable. U.S. Pat. No. 4,482,924, assigned to the assignee of the present invention, shows a system wherein a film to video player is made available for use by a customer/amateur photographer. A customer displays a selected negative on the film to video player, and manipulates zooming and scanning controls to define the region to be printed. The zoom and scan information defining the region to be printed is magnetically coded onto the negative film, and the negative film is sent to a photographic laboratory for printing. The laboratory places the film in a specially designed printer which reads the magnetically coded information, and adjusts its zoom and scan parameters accordingly to print the selected region of the negative.

U.K. published Patent Application GB No. 2 174 568 A shows a system wherein an operator manipulates a cropping frame on a positive display of the negative to be printed. When the region to be printed is identified within the cropping frame, a thermal print of the negative is made including the cropping frame. This thermal print is forwarded to the photographic laboratory, which uses the cropping frame as a guide in producing the final, cropped print.

While the above described methods/apparatus are more reliable when written communications, they suffer from the disdvantage of requiring the final print to be made by a professional photographic laboratory. Such a process requires a time delay, often of several days or a week, which is undesirable to both the customer and the laboratory. The customer is understandably irritated by the inconvenience, while the laboratory loses business as the customer loses interest.

U.S. Pat. No. 4,616,926, assigned to the assignee of the present invention, shows a film video player/printer which permits a customer to crop and print his negatives substanially immediately and by himself. The system includes a film-video player having user-controls which permit the customer to crop a negative in a straightforward manner on a positive video display. Upon completing this cropping process, the customer simply presses a "print" button, and a photographic print is made which is identical in composition to the video display. The system includes a photographic processor which operates to provide the completed print in a manner of minutes. This presents a substantial improvement over the prior art - both in terms of reliability (i.e. the customer gets exactly what he specifies) and time (i.e. the customer receives his print while he waits).

While representing a substantial improvement over the prior art, the system shown in U.S. Pat. No. 4,616,926 requires the use of a relatively complex and expensive optical apparatus. More specifically, the optical components of the system include a single zoom lens, used in combination with a pivoting mirror and auxiliary lens, to both provide the video display and print the negative. In providing the video display, the mirror is removed from the optical path, and the auxiliary lens is inserted to image the negative onto an electronic imager. The magnification of the zoom lens is then adjusted to aid in cropping the negative on the video display. Once the desired cropping is achieved, the auxiliary lens is pivoted out of the optical path, and the mirror is pivoted in to produce the print. This optical system, including the pivoting mirror and auxiliary lens, is relatively complex and expensive. Further, while producing adequate results, it is to some extent a compromise between the optical system needed to provide the video display and the optical system necessary for printing.

SUMMARY OF THE INVENTION

The principal object of the present invention is to provide a new and improved method and apparatus for printing a selected region of a photographic negative, in an enlarged and cropped format, onto a photographic paper.

Another object of the present invention is to provide a new and improved method and apparatus for imaging a selected region of a photographic transparency onto a selected medium.

In accordance with the present invention, a method of imaging a selected region of a photographic transparency onto a selected medium comprises projecting the transparency onto first and second zoom lenses, each of the zoom lenses having an adjustable magnification. The selected region of the transparency is defined by adjusting the magnification of the first zoom lens. To image the selected region onto the selected medium, the magnification of the second zoom lens is adjusted as a function of the first zoom lens. In a preferred embodiment of the invention, the step of defining the selected region to be imaged is performed by displaying the image formed by the first zoom lens on a video display, and having the operator adjust the magnification of the first zoom lens while examining the image formed thereby.

The present invention has particular application in printing a photographic transparency onto a photosensitive medium. In accordance with the invention, a method of doing the same is performed as set out immediately above, with the selected medium comprising the photosensitive medium, and with the additinal step of exposing the selected region of the photographic transparency onto the photosensitive medium, using the second zoom lens, for a predetermined period of time.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DETAILED DESCRIPTION OF THE INVENTION

Figure 1:
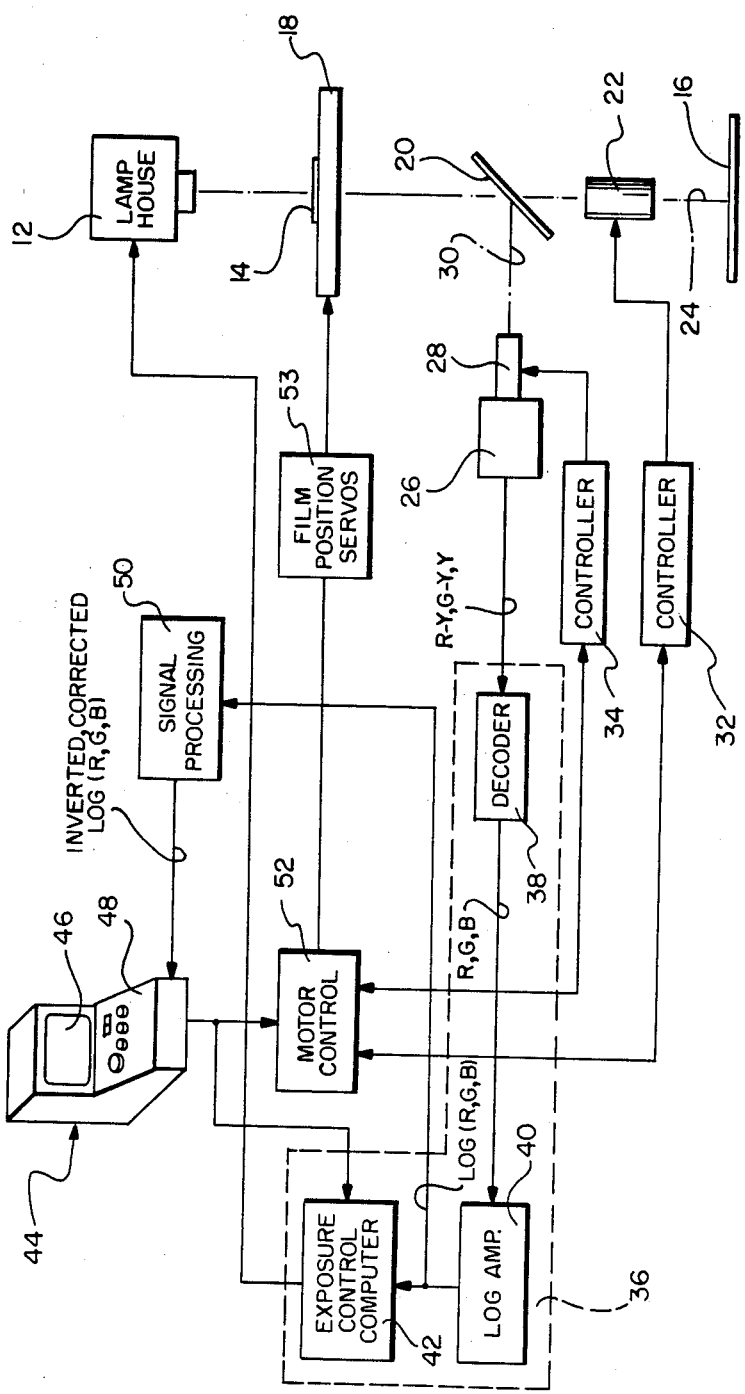
FIG. 1 is a partially schematic view of a photographic printer constructed in accordance with the present invention.

Referring now to FIG. 1, a photographic printing system 10 includes a lamphouse 12 for projecting light through a negative 14 to expose the negative onto a photographic paper 16. Lamphouse 12 comprises a conventional photographic printer-type lamphouse including color control means such as additive or subtractive color filters (not shown), and a shutter (also not shown) for controlling an exposure time. Negative 14 comprises a photographic transparency, for example a 135 mm- or disc-format color negative. Photographic paper 16 comprises, for example, a photosensitive medium such as Ektachrome 2001 photographic paper, available from Eastman Kodak Co.

Negative 14 is disposed on a rotatable, X-Y translatable support table 18. A suitable apparatus for table 18 is shown and described in U.S. Pat. No. 4,485,406, assigned to the assignee of the present invention, and incorporated herein by reference. Another suitable apparatus for table 18 is shown and described in co-pending, commonly owned, U.S. Patent Application Ser. No. 122,993 filed Nov. 17, 1987 (FILM HANDLING MECHANISM; D. Blanding, S. Amos, T. Jessop). Intermediate table 18 and photographic paper 16, are respectively, a beamsplitter 20 and a zoom lens 22. Beamsplitter 20 preferably comprises a pellicle-type beamsplitter. Lamphouse 12, negative 14, beamsplitter 20, paper 16 and zoom lens 22 are disposed on an optical axis 24 such that the zoom lens and the lamphouse are situated to print the negative onto the paper.

A video camera 26, including a second zoom lens 28, is disposed on a second optical axis 30 relative to beamsplitter 20 such that substantially identical images of negative 14 are proectable onto the first and second zoom lenses, 22, 28. Video camera 26 comprises, for example, a Sony model XC-117, including a solid-state, charge-coupled device (CCD) type imager (not shown). Zoom lens 28 comprises, for example, a model LP036KD zoom lens available from the Chinon Corp. Video camera 26 outputs color difference signals R-Y, G-Y, Y. First and second controllers, 32, 34, respectively, are disposed on first and second zoom lenses 22, 28, respectively, for controlling the aperture settings and zoom magnifications thereof. Controllers 32, 34 are described in further detail below.

An exposure control system 36 is provided including a decoder circuit 38 for converting color difference signals R-Y, G-Y, Y to R, G, B video signals, a log amplifier circuit 40 for log amplifying the color difference signals, and an exposure control computer 42, these latter three components being connected seriatim between the output of camera 26 and lamphouse 12. Decoder circuit 38 and log amplifier circuit 40 comprise suitable, commercially available devices. Exposure control computer 42 comprises, for example, a commercially available microprocessor such as an Intel model 86/30 SBC available from the Intel Corp.

An operator consol 44 is provided, including a video monitor 46, and an operator control panel 48. Video monitor 46 is connected to the output of log amplifier 40 through a signal processing circuit 50. Control panel 48 is connected to exposure control computer 42, and to a motor control circuit 52. Motor control circuit 52 is in turn connected to table 18 through appropriate film position servo-motors 53, and to respective zoom lens controllers 32, 34.

Video monitor 46 comprises a suitable, commercially available color monitor suchas a model 8CM515, available from the Magnavox Corp. Control panel 48 includes an appropriate user-interface for controlling the X-Y translation and rotation of table 14 and the magnification of zoom lens 28. Suitable apparatus is shown, for example, in U.S. Pat. No. 4,603,966, assigned to the assignee of the present invention, and incorporated herein by reference. Signal processing circuit 50 comprises appropriate circuitry for inverting and gamma-correcting the Log (R, G, B) video signals so as to drive video display 50, many configurations of which are well known to those skilled in the art. Optionally, signal processing circuit 50 may comprises the relatively sophisticated circuit, including both a reticle generator and border circuitry, shown in the above-cited U.S. Pat. No. 4,603,966, portions of which are further shown in U.S. Pat. Nos. 3,728,481, and 3,345,458. These latter two patents are also incorporated herein by reference. Control circuit 52 comprises, for example, a commercially available microprocessor such as that available from the Intel Corp. as model 80816, programmed to function in the manner described in detail hereinbelow.

Figure 2:
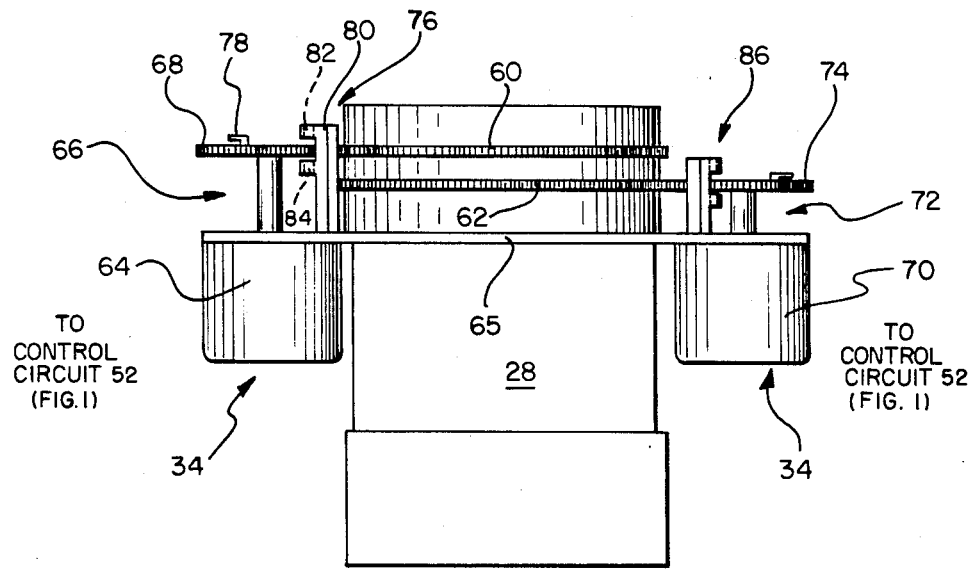
FIG. 2 is a plan view, partly in schematic, of a zoom lens including attached stepper motors from the printer of FIG. 1.
Figure 3:
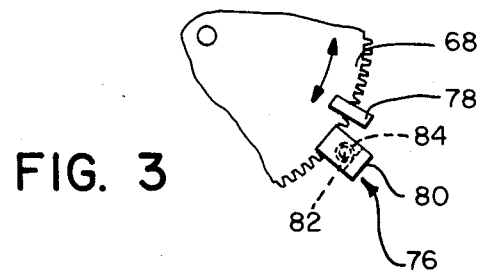
FIG. 3 is a top view of a portion of the zoom lens of FIG. 3 showing portions of the position sensing mechanism.

Referring now to FIGS. 2 and 3, a preferred embodiment of zoom lens 28 and associated controller 34 are shown in greater detail. For purposes of description, only zoom lens 28 and controller 34 are shown and described. As will be described below, zoom lens 22 and ist associated controller 32 operate in generally the same manner.

Describing FIG. 2, zoom lens 28 includes exposed, toothed, zoom magnification and aperture control rings 60, 62, respectively. A first, direct current (d.c.), permanent magnet, stepper motor 64 is mounted on zoom lens 28 via an appropriate bracket 65, and attached to zoom magnification control ring 60 via an appropriate drive mechanism 66. Drive mechanism 66 includes a gear 68 engaging control ring 60 for rotating the latter. A second such stepper motor 70 is similarly mounted on lens 28 via bracket 65, and coupled to aperture control ring 62 via a drive mechanism 72 including a gear 74. As an alternative to the use of gears 68, 74, drive belts (not shown) may be used to connect the motors to the lens adjustment rings.

Referring now to both FIGS. 2 and 3, associated with stepper-motor 64 is a position sensing mechanism indicated generally at 76. Position sensing mechanism 76 includes a tab or flag 78 fixed onto and hence movable with gear 68. Position sensing mechanism 76 further includes an F-shaped bracket 80, bracket 80 being fixed at its base to bracket 65 and hence being stationary relative to flag 78. Bracket 80 supports a light emitter 82 such as a light emitting diode, and a light sensor 84 such as a photodiode, the emitter and sensor being disposed in opposing relationship across the short arms of the "F". An identical position sensing mechanism, indicated generally at 86, is situated on stepper motor 70. Stepper motors 64, 70 each include connections to control circuit 52 (FIG. 1) for communicating control signals therewith. Light emitter 80 and light sensor 82 are likewise connected to control circuit 52 for communicating logic signals therewith.

In the operation of zoom lens 28, flag 78 is set at a known "starting" location on gear 68. Bracket 80, light emitter 82, light sensor 84 and flag 78 are relatively positioned such that, in the course of rotation of gear 68, the flag will interrupt the light path between the light emitter and light sensor when the starting magnification is obtained. When stepper-motor 64 is to be controlled, motor control circuit 52 functions to activate light emitter 82 and monitor the output of light sensor 84. When the light path between light emitter 82 and light sensor 84 is broken, motor control circuit 52 senses this break and is thus positioned at the starting magnification of zoom lens 28. Motor control circuit 52 is then operated to precisely control the motion of stepper motor 64, and thereby alter the magnification of zoom lens 28 to a precisely known extent. Stepper motor 70 and position sensor 86 are used in the identical manner to control the aperture setting of zoom lens 22. While zoom lens 22 has a different function and thus may be different in size and construction, zoom lens 22 and its associated controller 32 are identical in the use of stepper motors to control the lens magnification and aperture adjustments.

In operation, described now with reference to FIGS. 1-4, upon initiating operation of printing system 10, motor control circuit 52 functions to step stepper motor 64 of controller 34 until flag 78 breaks the light beam between light emitter 82 and light sensor 84. When motor control circuit 52 senses the light beam is broken, the zoom magnification of lens 28 is set to the starting magnification. The aperture setting of zoom lens 28 is likewise set to a starting setting using stepper motor 70 and position sensing mechanism 86. Motor control circuit 52 functions to set up zoom lens 22 in an identical manner through controller 32. This set up of the starting magnifications and aperture settings of lenses 22, 28 is performed substantially automatically (i.e. without operator intervention) by motor control logic 52 responsive to the insertion/replacement of negative 14, and is indicated by block 90 of the flow chart in FIG. 4.

Coincident with, or immediately after the set up of zoom lens 28, signal processing circuit 50 and video monitor 46 are activated to display negative 14 on the video monitor. In a manner well known to those skilled in the art, signal processing circuit 50 functions to invert the signal output of log amplifier circuit 40, whereby to form a positive image signal of negative 14. Signal processing circuit 50 further functions to provie gamma correction, as required, for driving video monitor 46.

Figure 4:
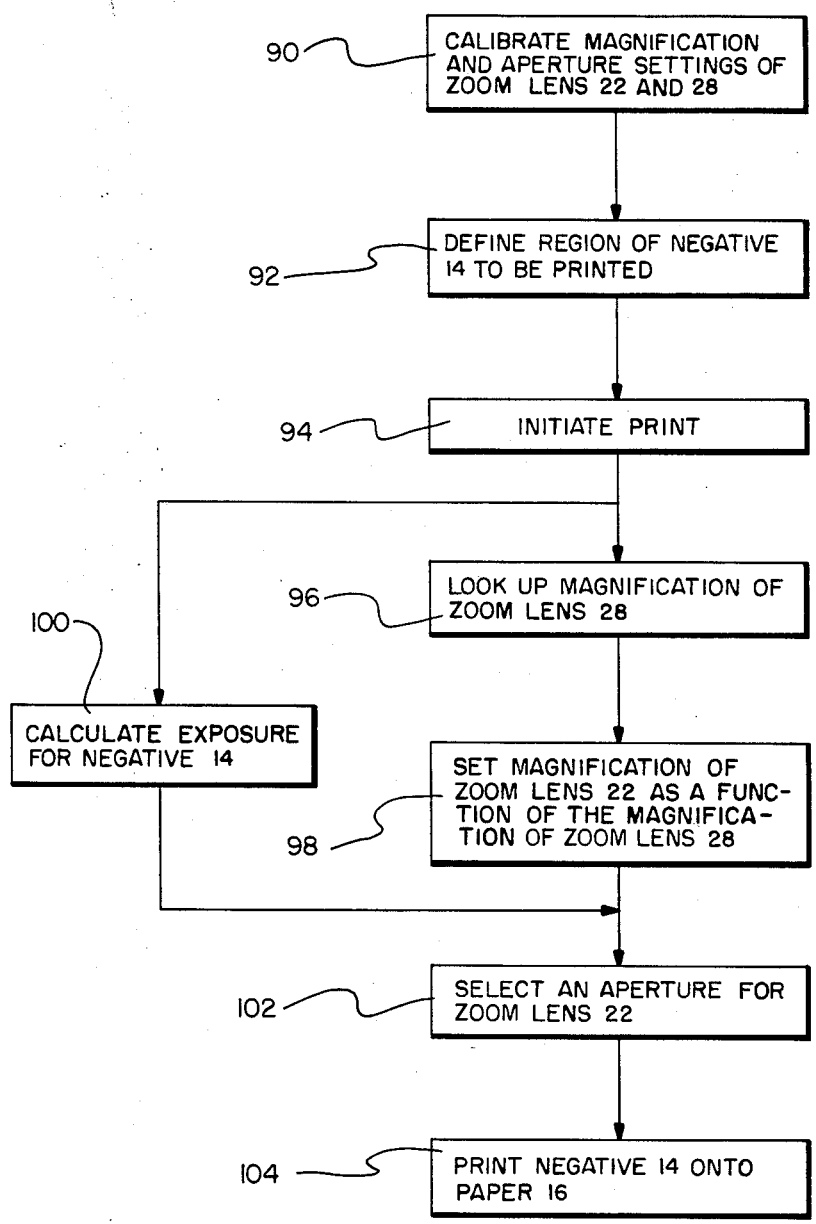
FIG. 4 is a flow chart showing the method of synchronizing the operation of the zoom lenses from printer 10 of FIG. 1.

As indicated at block 92 of FIG. 4, interactively with the display of negative 14 on video monitor 46, and through the manipulation of controls on control panel 48, a human operator defines the region of negative 14 to be printed. This definition of the selected region of negative 14 is accomplished by varying the magnification of zoom lens 28 while rotating and/or translating table 18 such that the selected region just fills video display 46 (or a reticle displayed thereon). With the selected region of negative 14 thusly displayed on video display 46, it will be appreciated that the selected region is also centered on optical printing axis 24. The magnification of zoom lens 28 is adjusted by operator manipulation of an appropriate control, such as a slide control, on control panel 48. The output of this control is input to motor control circuit 52, which in turn steps stepper motor 64 to vary the magnification of zoom lens 22 accordingly. Adjustment of table 18 is likewise initiated by manipulation of controls on control panel 48, and is consummated through the operation of appropriate film position servo-motors 53 by motor control circuit 52. Appropriate apparatus for accomplishing these functions is shown in the above referenced U.S. Pat. Nos. 4,485,406, and 4,603,966.

As the operator adjusts the magnification of zoom lens 28, motor control circuit 52 further functions to adjust the aperture of zoom lens 28 with motor 70, so as to accommodate for the effective change in aperture of the zoom lens as its magnification is varied. This adjustment, which is programmed into and automatically performed by motor control circuit 52, functions to maintain uniform brightness on video display 46 during the cropping process.

When the adjustments described immediately above are complete, the region of negative 14 which is desired to be printed in an enlarged, cropped format fills the display (or a highlighted region of the display) of video monitor 46. This selected region of negative 14 is centered on optical axis 24, and the magnification setting of zoom lens 28 is known to and stored in motor control circuit 52.

Once the selected region of negative 14 is defined in the manner described above, the operator initiates the making of a photographic print of the region, as indicated in block 94 of FIG. 4. The print is initiated by the manipulation of an appropriate control, such as a pushbutton, on control panel 48. This initiation of a print signals exposure control computer 42 and motor control circuit 52 that the selected region of negative 14 is defined, and that a photographic print is to be made of this region onto photographic paper 16.

Pursuant to blocks 96, 98 of FIG. 4, when motor control circuit 52 is signaled that a print is to be made it recalls the zoom magnification setting of zoom lens 28 (which may be stored, for example, as the number of steps taken by stepper motor 64, in Random Access Memory (RAM)). Motor control circuit 52 then sets the zoom magnification position of zoom lens 22 as a function of the known ending magnification position of zoom lens 28. The magnification setting of zoom lens 22 is selected such that the same region of negative 14 viewed on video monitor 46 is printed on photographic paper 16. This magnification setting is determined as a function of such items as the relative areas of the imager in camera 26 and photographic paper 16, and the relative optical distances between these two elements and negative 14. The functional relationship between the magnification settings of zoom lenses 28 and 22 necessary to print the selected region of negative 14 are thus seen to depend on readily apparent structural relationships within printing system 10. The calculation of this functional relationship is well within the purview of those possessing ordinary skill in the art.

Concomitant with the setting of the magnification of zoom lens 22, exposure control computer 42 calculates an appropriate exposure for negative 14 as shown in block 100 of FIG. 4. As described above, at this point in the process of printing negative 14, camera 26 is viewing on its imager only that region of the negative to be printed. The color difference signals R-Y, G-Y, Y output by camera 26 are decoded by decoder 38 into R, G, B video signals. These R, G, B video signals are log amplified by log amplifier 40 to provide Log (R, G, B) signals to exposure control computer 42.

Having been signaled that a print is to be made, exposure control computer 42 uses the Log (R, G, B) signals in an appropriate exposure calculation algorithm to calculate an exposure for negative 14. In a preferred embodiment of the invention, exposure control computer 42 first functions to reduce the Log (R, G, B) data, for example by averaging adjoining pixels. The resultant reduced data, which is substantially equivalent to scanning the R, G, B transmissive densities of negative 14 at a plurality of discrete locations, is then used in the exposure calculation algorithm to calculate an exposure for negative 14. In the preferred embodiment of the invention, the exposure of negative 14 is calculated as a function of the scanned picture density in the region defined for printing. Many other appropriate exposure calculation algorithms will be known to those skilled in the art, including, for example, algorithms bsed on primary subject determination, center-weighted algorithms, and algorithms based on flesh-tone measuremets.

Upon adjustment of the magnification and aperture settings of zoom lens 22, exposure control computer 42 initiates the exposure of the selected region of negative 14 onto paper 16 by opening the shutter in lamphouse 12. Proper exposure is obtained by controlling the color filter mechanism within lamphouse 12, and the exposure is terminated by closing the shutter. This printing process is indicated at 104 of FIG. 4. Proper exposure of negative 14 can also be effected by adjusting the aperture of zoom lens 22 as determined necessary by exposure control computer 42. Such aperture adjustment can compensate for the effective change in the f-stop of zoom lens 22 as its magnification setting is changed in the manner described above. This aperture adjustment, indicated at 102 of FIG. 4, is performed by motor control circuit 52 through controller 32. At this point, a photographic paper processor can be conveniently made available, and paper 16 immediately processed to provide a completed, cropped photographic print.

In the above described embodiment of the invention, negative 14 is positioned such that the region thereof defined for printing just fills the imager of video camera 26. In another embodiment of the invention, a portion of the imager in video camera 26 is blacked out by a physical cover. Graphical operating instructions in the form of video data are supplied by signal processing circuit 50, and displayed in the otherwise correspondingly blacked-out region of video display 46 (preferably along a side edge of the display).

As will be apparent from a consideration of FIG. 1, with a portion of the imager in video camera 26 covered, as the selected region of negative 14 is defined for printing (step 92 of FIG. 4), this region is moved off of optical axes 24, 30. When a print is initiated (step 94 of FIG. 4), motor control circuit 52 functions to recenter the selected region of negative 14 (as displayed on video monotir 46) on optical axis 24. The amount and direction of recentering required is an obvious function of the portion of the video camera 26 imager covered, and is readily discernable to those skilled in the art. The implementation of this recentering is also readily programmed into motor control circuit 52, and effected through control of table 18. In this embodiment of the invention, a frame store can be provided in signal processing circuit 50 so that the video image on video display 46 does not change as negative 14 is centered on optical axis 30 for printing.

Alternatively, in the embodiment described immediately above, camera lens 28 can be positioned on camera 26 such that it is centered on the active, uncoverer portion of the CCD imager. In this embodiment, of the invention, negative 14 remains on the optical axis 24 throughout the printing process.

There is thus provided a new and improved printing system for printing a photographic negative, in a cropped format, onto a photographic paper. The printing system permits a relatively low skilled operator, such as an amateur photographer, to crop a negative on a video monitor. Responsive to the cropping, the printing system automatically prints the selected portion of the negative onto a portion of photographic paper. A photographic paper processor is optionally located with the printing system for substantially immediately providing developed prints. The printing system is relatively straightforward in construction in comparison to the prior art systems discussed herein above. Further, the system, particularly the optical portions thereof, can be implemented using substantially entirely commercially available components.

While a preferred embodiment of the invention has been illustrated and described, it will be clear that the invention is not so limited. Numerous modifications, changes, variations, substitutions, and equivalents will occur to those skilled in the art without departing from the spirit and scope of the present invention.

What is claimed is:

1. A method of imaging a selected region of a transparency onto a selected medium, comprising the steps of:

projecting said transparency onto first and second zoom lenses, each of said first and second zoom lenses having an adjustable magnification;

defining, by adjusting the magnification of said first zoom lens, said selected region of said transparency; and adjusting, as a function of the magnification of said first zoom lens, the magnification of said second zoom lens so as to image said selected region of said transparency onto said selected medium.

2. A method in accordance with claim 1 wherein said defining step is performed by a human operator adjusting the magnification of said first zoom lens while examining the image formed thereby.

3. A method in accordance with claim 2 wherein said defining step further comprises displaying the image formed by said first zoom lens on a video display.

4. A method in accordance with claim 2 wherein said adjusting step is performed automatically dependant on the operator setting of said first zoom lens.

5. A method in accordance with claim 4 wherein said defining step is performed by stepping the magnification of said first zoom lens responsive to said operator adjusting.

6. A method in accordance with claim 5 wherein said adjusting step is performed by stepping the magnification of said second zoom lens.

7. Apparatus for imaging a selected region of a transparency onto a selected medium comprising:
first and second zoom lenses, each having an adjustable magnification;
means for projecting said transparency onto said first and second zoom lenses;
means for defining, by adjusting the magnification of said first zoom lens, said selected region of said transparency; and
means for adjusting, as a function of the magnification of said first zoom lens, the magnification of said second zoom lens so as to image said selected region of said transparency onto said selected medium.

8. Apparatus in accordance with claim wherein said projecting means includes a beamsplitter.

9. Apparatus in accordance with claim 7 wherein said defining means includes means for a human operator to adjust the magnification of said first zoom lens while examining the image formed thereby.

10. Apparatus in accordance with claim 9 wherein said defining means further comprises means for displaying the image formed by said first zoom lens on a video display.

11. Apparatus in accordance with claim 9 wherein said adjusting means includes means for automatically adjusting the magnification of said second zoom lens dependent on the operator adjustment of said first zoom lens.

12. Apparatus in accordance with claim 10 wherein said human operator adjusting means includes:
a stepper motor attached to said first zoom lens for adjusting the magnification of said first zoom lens; and
means responsive to operator interaction for stepping said stepper motor.

13. Apparatus in accordance with claim 12 wherein said defining means further includes means for storing the position of said stepper motor.

14. Apparatus in accordance with claim 13 wherein said adjusting means includes:
a second stepper motor attached to said secod zoom lens for varying the magnification thereof;
means attached to said second stepper motor for stepping said second stepper motor as a function of the position of the first said stepper motor.

15. A method of printing a selected region of a photographic transparency onto a photosensitive medium whereby to form an enlarged and cropped print of said photographic transparency, comprising the steps of:
projecting said photographic transparency onto first and second zoom lenses, each of said first and second zoom lenses having an adjustable magnification;
defining, by adjusting the magnification of said first zoom lens, said selected region of said photographic transparency;
adjusting, as a function of the magnification of said first zoom lens, the magnification of said second zoom lens so as to image said selected region of said photographic transparency onto said photosensitive medium; and
exposing said selected region of said photographic transparency onto said photosensitive medium, using said second zoom lens, for a predetermined period of time.

16. A method in accordance with claim 15 wherein said projecting step comprises:
projecting light through said photographic transparency; and
splitting the light projected through said photographic transparency with a beamsplitter.

17. A method in accordance with claim 15 wherein said defining step is performed by a human operator adjusting the magnification of said first zoom lens while examining the image formed thereby.

18. A method in accordance with claim 17 wherein said adjusting step is further performed by the steps of:
impinging the image formed by said first zoom lens onto a video imaging means; and
displaying the output of said video imaging means on a video display.

19. A method in accordance with claim 17 wherein said defining step comprises:
initializing the magnification of said first zoom lens at a starting magnification;
stepping, responsive to instruction by said human operator, the magnification of said first zoom lens to an operator determined ending magnification; and
storing a signal representative of said ending magnification.

20. A method in accordance with claim 19 wherein said adjusting step comprises:
reading said signal representative of said ending magnification; and
stepping the magnification of said second zoom lens to a magnification determined as a function of the ending magnification of said first zoom lens.

21. A method in accordance with claim 20 wherein said first and second zoom lenses each includes a variable aperture, and wherein said exposing step includes stepping the aperture settings of said first and second zoom lenses.

22. Apparatus for printing a selected region of a photographic transparency onto a photosensitive medium whereby to form an enlarged and cropped print of said photographic transparency, comprising:
means for projecting said photographic transparency onto first and second zoom lenses, each of said first and second zoom lenses having an adjustable magnification;
means for defining, by adjusting the magnification of said first zoom lens, said selected region of said photographic transparency;
means for adjusting, as a function of the magnification of said first zoom lens, the magnification of said second zoom lens so as to image said selected region of said photographic transparency onto said photosensitive medium; and
means for exposing said selected region of said photographic transparency onto said photosensitive medium, though said second zoom lens, for a predetermined period of time.

23. Apparatus in accordance with claim 22 wherein said projecting means comprises:
   means for projecting light through said photographic transparency; and
   a beamsplitter disposed so as to direct the light projected through said photographic transparency onto said first and second zoom lenses.

24. Apparatus in accordancr with claim 22 wherein said defining means comprises means for a human operator to adjust the magnification of said first zoom lens while examining the image formed thereby.

25. Apparatus in accordance with claim 24 wherein said defining means further comprises:
   video imaging means for sensing the image formed by said first zoom lens; and
   means for displaying the output of said video imaging means.

26. Apparatus in accordance with claim 24 wherein said defining means further comprises means responsive to input by said human operator for selectively translating or rotating said photographic transparency in the plane of said photographic transparency.

27. Apparatus in accordance with claim 24 wherein said defining means further comprises:
   a first stepper motor connected to said first zoom lens;
   means connected to said first stepper motor for initializing the magnification of said first zoom lens to a starting magnification;
   means connected to said first stepper motor for stepping, responsive to instruction by said human operator, the magnification of aid first zoom lens to an operator determined ending magnification.

28. Apparatus in accordance with claim 27 wherein said defining means further comprises means for storing a signal representative of said ending magnification.

29. Apparatus in accordance with claim 28 wherein said adjusting means comprises:
   means for reading said signal representative of said ending magnification;
   a stepper motor connected to said second zoom lens; and
   means connected to said second stepper motor for stepping the magnification of said second zoom lens to a magnification determined as a function of the ending magnification of said first zoom lens.

30. Apparatus in accordance with claim 29 wherein said adjusting means further comprises means connected to said second stepper motor for initializing the magnification of said second zoom lens to a starting magnification.

31. Apparatus in accordance with claim 24 wherein:
   said first and second zoom lenses each include variable apertures; and
   said exposing means includes separate stepper motors connected to said first and second zoom lenses, respectively, for varying the apertures thereof.

* * * * *